Patented June 25, 1929.

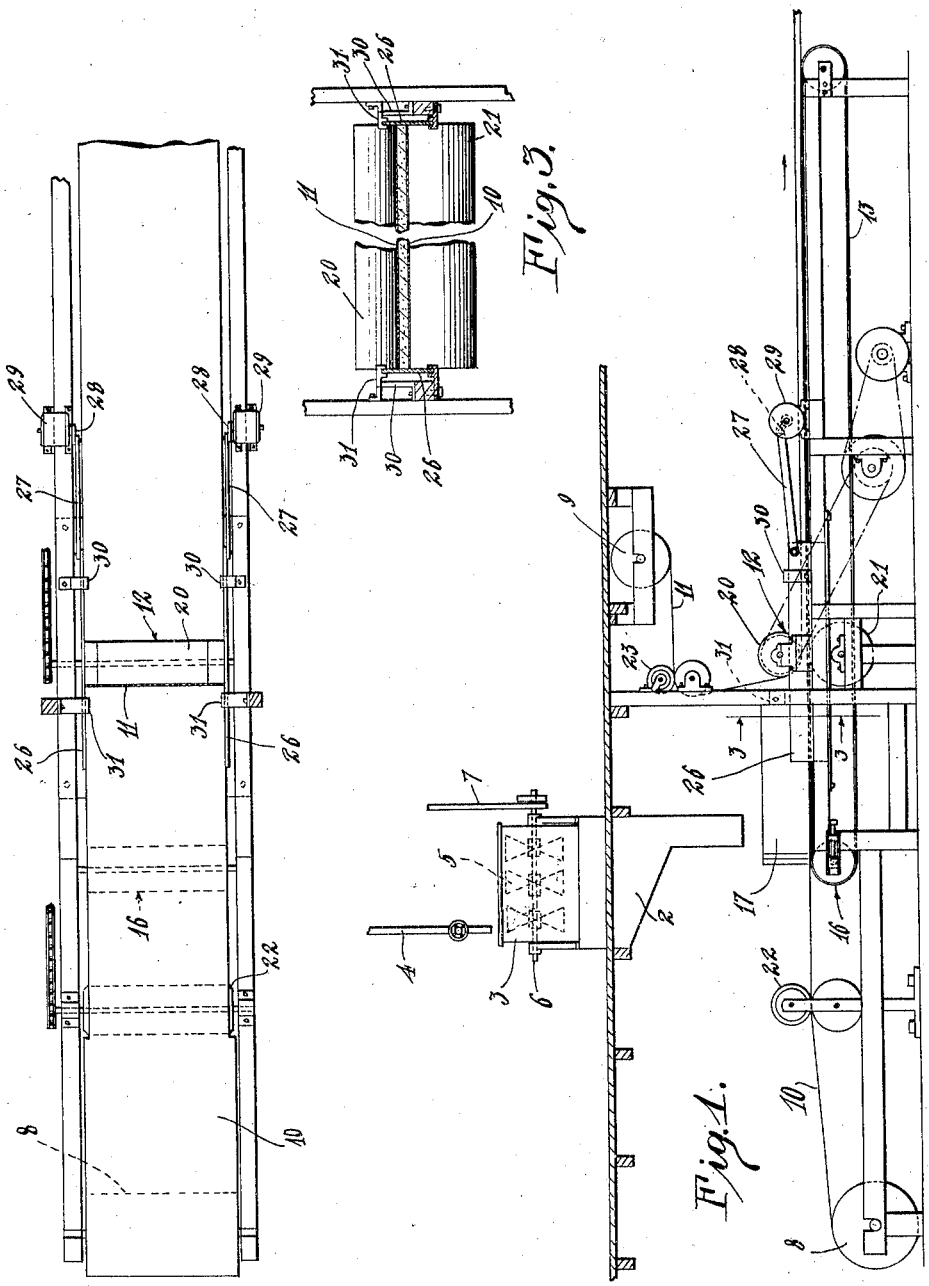

1,718,712

UNITED STATES PATENT OFFICE.

JOHN SCHUMACHER, OF LOS ANGELES, CALIFORNIA.

METHOD AND MEANS FOR FORMING PLASTER BOARD.

Application filed November 3, 1925. Serial No. 66,458.

This invention relates to a method and apparatus for forming plaster board.

With the method and apparatus for forming plaster board heretofore employed, the edges of the plaster board as formed are rough and uneven and hence it is necessary to cut away a portion of the board to form a finished product. This involves considerable expense and waste of material.

It is an object of the present invention to provide a method and means for forming plaster board which is adapted to form a finished edge as the board is formed to the end that the ordinary expense of cutting away and trimming the edges of the plaster board as formed may be eliminated and that a decreased waste be obtained in the formation of the plaster board. In the copending application of John Schumacher, Serial No. 11,169, filed February 24, 1925, Patent No. 1,581,328, April 20, 1926, there is a method and apparatus for forming plaster board described in which the edges are finished and brought to a smooth firm edge by the employment of a troweling operation, that is, a continual passing of a straight edge back and forth across the plaster board as formed as well as through a relative longitudinal motion between the straight edges of the plaster board as formed.

The present invention is concerned with an improved method and means for finishing the edges of a plaster board which in place of troweling the edges produces a finished form edge by a reciprocation of a straight edge in the direction of travel of the plaster board, producing a somewhat harder finished edge and therefore producing a board better adapted for certain purposes.

The various other objects and advantages of the present invention will be apparent from the description of a preferred form of the method and means for forming a plaster board embodying this invention. For this purpose, reference is made to the accompanying drawings illustrating a preferred form of an apparatus for forming a plaster board by which a preferred method of forming plaster board may be practiced.

In the drawings:

Figure 1 is a side elevation of the apparatus.

Figure 2 is a plan view, and

Figure 3 is a section on the line 3—3 of Figure 1.

Referring to the drawings, the apparatus there illustrated comprises a hopper 2 for holding and supplying plastic or cementitious material which is to be incorporated in the plaster board. 3 indicates a mixer for mixing the plastic or cementitious material with water supplied from the pipe 4. The mixer 3 preferably consists of a trough in which are mounted rotatable mixing plates 5, the plates being mounted upon the shaft 6 driven by a pulley 7. 8 and 9 respectively indicate supply rolls of fibrous covering material which furnish the covering sheets for the plaster board to be produced. 10 indicates a sheet or strip of fibrous material supplied from the roll 8 for forming the lower covering sheet of the produced plaster board, whereas 11 indicates a sheet or strip supplied from the roll 9 as the upper sheet of the plaster board is formed.

The sheets 10 and 11 are indicated as passing to the plaster board forming a spreading means generally indicated at 12. Suitable advancing means 13 are provided for continually conveying the plaster board being formed to the discharge end of the apparatus, such advancing means being indicated as comprising a conveyor 16. The advancing means 13 is adapted to discharge successively separate portions of the formed plaster board upon a receptacle such as a truck (not shown).

The spreading and forming means 12 of the apparatus include an upper roller 20 and a lower roller 21, spaced apart to determine the thickness of the finished board. As the sheets 10 and 11 are fed between the rollers 20 and 21, plastic or cementitious material is fed from the hopper 2 into a box 17 likewise positioned on the advancing means 13 from which the plastic or cementitious material is forced between the rollers 20 and 21 and spread thereby between the sheets 10 and 11 to produce a plaster board of the desired thickness. In so far as the apparatus and method of forming plaster board has been particularly described, it is similar to the present generally accepted apparatus and method particularly described and claimed in Patent No. 1,176,322, granted to John Schumacher and Joseph E. Schumacher, March 21, 1916.

With the ordinary type of such plaster board method and apparatus, the edges of the board as they leave the forming and spreading means 12 are irregular and the unequal edges must be cut off and the board trimmed with a corresponding waste of material and increased production cost. These disadvantages are overcome by the method and means of the present invention.

In accordance with the principles of this invention, the sheets of fibrous covering material 10 and 11 fed to the spreading and forming means are made substantially equal in length to the rolls 20 and 21. In practical operation, however it is found that it is almost universally necessary to trim the fibrous covering sheets 10 and 11 to the exact desired size at the time of the finish of the plaster board and for this purpose there are provided trimming means 22 and 23 for trimming the sheets. These trimming means may be of any desired form but are indicated as in the form of disc knives.

Where mention is made of the provision of the feeding or trimming of sheets so that the sheets correspond with the width of the rolls 20 and 21, it is to be understood that this is in reference to the width of such sheets at the time they pass between the rolls 20 and 21. The contact between the sheets 10 and 11 and the moist plastic or cementitious material supplied from the box 17 causes in operation a slight swelling of the sheets 10 and 11 amounting to a fraction of an inch and accordingly an allowance must be made for this swelling. The extent of the swelling will depend upon the particular character of the fibrous covering material employed and hence no definite figure can be given but is readily determinable for any particular fibrous covering material by running a small quantity thereof through the apparatus.

In order to prevent the plastic or cementitious material being squeezed out from the edges of the sheets 10 and 11, there is provided straight edge forming members 26 abutting the sides of the rolls 20 and 21 to provide a definite limit to the sideways motion of the plastic or cementitious material. These edge forming members 26 are each held in spaced guides 30 and 31. Were these straight edge forming members 26 left merely stationary or caused to travel at a speed at all times equal to that of the plaster board form, a smooth hard edge would not result and accordingly provision is made for producing a reciprocation of these edges in relation to the plaster board form. This reciprocation it is understood may be accomplished by any desired form of mechanical apparatus and drawings illustrating the reciprocation as effected by a pitman 27 connected to crank arms 28 on the motors 29.

The straight edge forming members 26, by their continual reciprocation longitudinally of the plaster board, not only provide a definite limit to the outward passage of the plastic and cementitious material but operate to compact the plastic or cementitious matter at the edges so that the edges are formed smooth and hard and a plaster board is produced requiring no further trimming of its edges for practical use. The edge forming members 26 are preferably driven at a substantially higher rate of speed than the rate of movement of the formed plaster board and this element of high relative speed is found to be of great importance in securing an even edge.

While the method and apparatus for forming plaster board herein described is well suited for accomplishing the purposes of this invention, it is to be understood that various modifications in the details of the method and apparatus may be made without departing from the spirit of the invention, and the invention is not therefore limited to the specific form described, but is of the scope set forth in the appended claims.

What I claim is:

1. A method of forming plaster board comprising continually advancing fibrous covering sheets to spaced rolls, continually feeding cementitious or plastic material between the sheets as passed between such rolls, and continually forming even edges on the plaster board as formed by reciprocation of a straight edge against the edges of fibrous covering sheets at the point the plaster board is formed, said reciprocation being at a substantially higher rate of speed than the rate of advance of the sheets.

2. An apparatus for forming plaster board comprising fibrous covering material supply means, forming and spreading means, means for advancing fibrous covering material to the forming and spreading means and conveying the same therefrom, means for supplying plastic or cementitious material between the fibrous covering materials in the forming and spreading means, and straight edges placed against the edges of the fibrous covering material in the forming and spreading means, and means for continually reciprocating said straight edges in the direction of advance of the formed plaster board at a rate in excess of the rate of advance of said board.

3. A method of forming plaster board comprising continually advancing fibrous covering material, continuously incorporating plaster material between the fibrous covering material during the advance thereof, and continuously reciprocating a straight edge at the edge of the produced board as the same is formed, said reciprocation being at relatively more rapid rate than the rate of advance of the covering material.

4. An apparatus for forming plaster board comprising fibrous covering material supply means, forming and spreading means, means for advancing the covering material to the forming and spreading means and conveying the produced plaster board therefrom, means for supplying plastic material to the forming and spreading means, straight edges reciprocally mounted at the ends of the forming and spreading means, and means for reciprocating said straight edges at a speed substantially in excess of the rate of advance of the produced board.

Signed at Los Angeles, California, this 28 day of October 1925.

JOHN SCHUMACHER.